E. PUGSLEY.
BOLT GUN.
APPLICATION FILED DEC. 2, 1918.
1,316,803.
Patented Sept. 23, 1919.
2 SHEETS—SHEET 1.
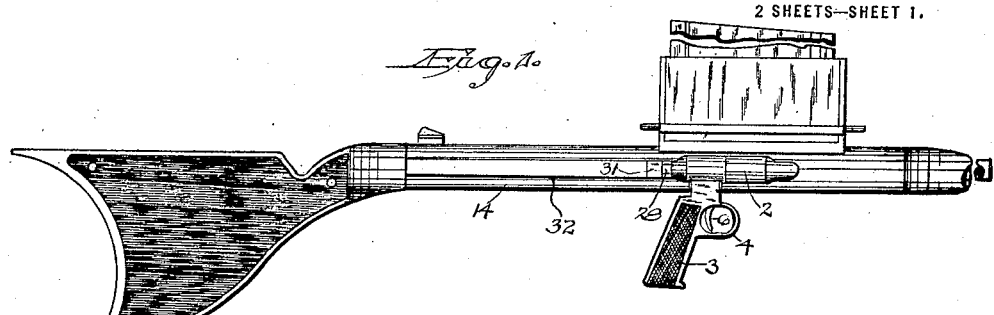
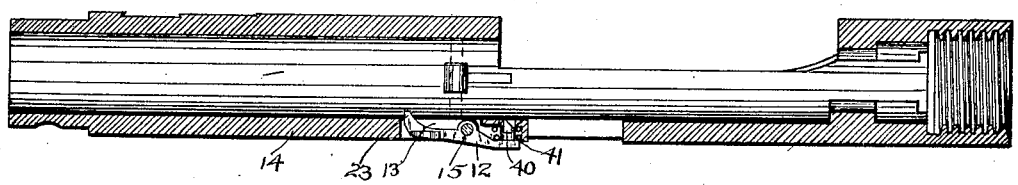
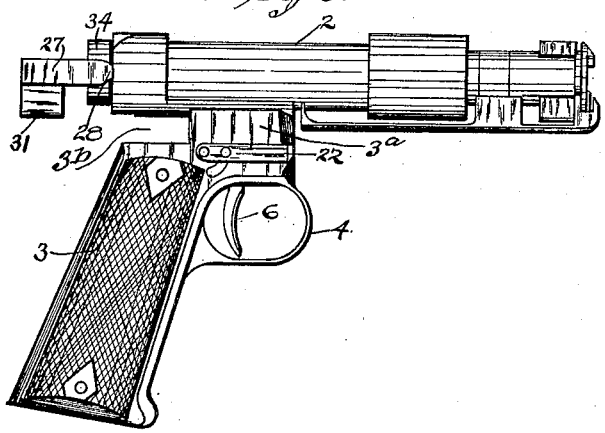 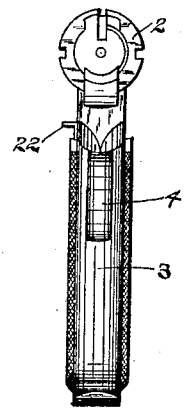
Inventor
Edwin Pugsley
by Seymour Pearce
Atty E. PUGSLEY.
BOLT GUN.
APPLICATION FILED DEC. 2, 1918.
1,316,803.
Patented Sept. 23, 1919.
2 SHEETS—SHEET 2.
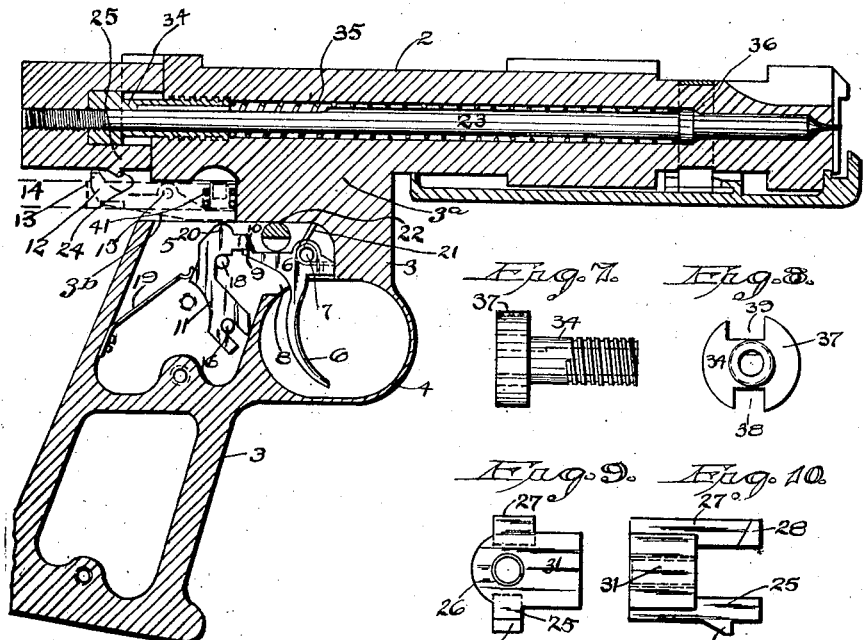

UNITED STATES PATENT OFFICE.

EDWIN PUGSLEY, OF NEW HAVEN, CONNECTICUT, ASSIGNOR TO WINCHESTER REPEATING ARMS CO., OF NEW HAVEN, CONNECTICUT, A CORPORATION.

BOLT-GUN.

1,316,803.

Specification of Letters Patent. Patented Sept. 23, 1919.

Application filed December 2, 1918. Serial No. 264,942.

*To all whom it may concern:*

Be it known that I, EDWIN PUGSLEY, a citizen of the United States, residing at New Haven, in the county of New Haven and State of Connecticut, have invented a new and useful Improvement in Bolt-Guns; and I do hereby declare the following, when taken in connection with the accompanying drawings and the characters of reference marked thereon, to be a full, clear, and exact description of the same, and which said drawings constitute part of this application, and represent, in—

Figure 1 a broken view in side elevation of a bolt gun embodying my invention.

Fig. 2 a detached view in vertical central section of the receiver thereof.

Fig. 3 a detached view in side elevation of the bolt thereof, showing a trigger mechanism mounted in its handle.

Fig. 4 a view thereof in front elevation.

Fig. 5 an enlarged detached view of the bolt and bolt-handle in vertical central section, showing the mounting of the trigger mechanism in the bolt handle, and, for convenience, also showing the sear which is mounted in the receiver, not represented in this view.

Fig. 6 a broken plan view showing the rear end of the bolt and the cocking-piece, the latter being shown in its retracted position in which the firing-pin is cocked.

Fig. 7 a detached view in side elevation of the bolt-plug.

Fig. 8 a view thereof in rear elevation.

Fig. 9 a detached plan view of the cocking-piece.

Fig. 10 a view thereof in side elevation.

Fig. 11 a detached plan view of the trigger.

Fig. 12 a view thereof in side elevation.

Fig. 13 a corresponding view of the secondary trigger.

Fig. 14 a front view thereof.

Fig. 15 a view of the sear in side elevation.

Fig. 16 a plan view thereof.

My invention relates to an improved bolt gun of the type in which the bolt has longitudinal and limited rotary movement, the object being to increase the rapidity of aimed fire of guns of this class.

With these ends in view, my invention consists in a bolt gun in which the trigger mechanism is carried by the bolt and participates in its longitudinal and rotary movement.

My invention further consists in a bolt gun having its longitudinally movable and rotary bolt provided with a handle in which a trigger mechanism is mounted in position to co-act with a sear mounted in the receiver.

My invention further consists in certain details of construction and combinations of parts as will be hereinafter described and pointed out in the claims.

In carrying out my invention as herein shown, the longitudinally movable and rotary bolt 2 is provided with an integral handle consisting of a grip 3 and an offset $3^a$ and formed with a trigger-guard 4 and a trigger-chamber 5 located to the rear thereof. The offset $3^a$ offsets from the bolt at a right angle to the axis thereof, while the grip 3 is offset from the rear lower corner of the offset $3^a$ for the production of a sear-space $3^b$ to receive the sear 12 mounted in the receiver 14 when the bolt is turned into its locked position at the limit of its forward excursion. The trigger 6 is hung upon a pin 7 in the forward end of the said chamber 5 and extends downward through a slot 8 into the guard 4 as clearly shown in Fig. 5. The nose 9 of the trigger engages with a beveled nose 10 at the upper end of a secondary or intermediate trigger 11 located entirely within the chamber 5 and forming as it were, a connector between the trigger proper and the sear 12 which is located in a slot 13 in the lower wall of the receiver 14 which may be of any approved construction, the sear rocking upon a pin 15 therein. The secondary trigger or "connector," as it might be called, has a combined sliding and rocking movement upon a pin 16 entering a notch 17 in its lower end, its sliding and rocking movement being limited by a stop-pin 18 and a spring 19 both located within the chamber 5. At its extreme upper end it is formed with a rounded lug 20 which engages with the lower face of the forward end of the sear 12. A wire spring 21 encircling the pivot-pin 7 of the trigger exerts a constant effort to throw the same forward into its normal position. A safety lock 22 of ordinary construction is mounted in the bolt handle 3 in position to engage with the upper face of the rear portion of the trigger for cutting the same out of action when desired.

It will be seen from the foregoing that the trigger mechanism proper of my improved gun is entirely mounted in and carried by the handle 3 of the bolt 2 so as to participate in the longitudinal and rotary movement thereof, this being the characteristic feature of my present invention, whatever changes may be made in the specific character of the trigger mechanism or the number of its parts.

At its rear end the sear 12 is formed, as shown, with an upwardly turned nose 23 which engages with a beveled catch 24 upon the outer face of the forwardly projecting arm 25 of a cocking-piece 26 having a complementary arm 27 the forward end of which is rounded as at 28 to have camming action within a cam slot 29 formed in a wide shoulder or guide 30 at the rear end of the bolt 2. The cocking-piece 26 also has an offsetting guide-lug 31 traveling in a longitudinal slot 32 in the receiver 14, whereby the cocking-piece is held against rotation. The said cocking-piece 27 is mounted upon the rear end of a firing-pin 23 extending throughout the length of the bolt 2 and having bearing at its forward end therein and bearing at its rear end in a plug 34 threaded into the rear end of the bolt. The forward end of this plug forms an abutment for the rear end of the firing-pin spring 35 which encircles the firing-pin and bears at its forward end against a shoulder 36 thereupon. The rear end of the plug 34 is formed with a head 37 having a slot 38 for the reception of the arm 25 of the cocking-piece, and with a slot 39 for the reception of the arm 27 thereof. At is forward end the sear 12 is formed with an upstanding post or guide 40 carrying a helical sear-spring 41. The upper end of the trigger-chamber 5 is open to permit the forward end of the sear to co-act directly with the upper end of the secondary trigger or "connector" when the bolt is rotated at the limit of its forward excursion to enter the sear into the sear space 3ᵇ as already described.

Inasmuch as the specific mechanical operations of cocking and firing my improved gun are the same as in ordinary bolt guns, I deem it unnecessary to rehearse them here but on account of mounting the trigger mechanism directly in the bolt-handle, it is unnecessary for the user of the gun to remove his hand from the handle in order to operate the trigger, whereby the rapidity of aimed fire is increased.

As already stated, my invention is characterized by having the trigger carried by the bolt and traveling therewith instead of being mounted in a part of the receiver or some appendage thereof.

I claim:—

1. A bolt gun having a longitudinally movable and rotary bolt provided with a fixed handle comprising an offset from the bolt and a grip offsetting from the rear corner of the said offset to form a sear-space, a trigger installed in the said handle, and a sear installed in the receiver of the gun in position to co-act with the trigger when the same has been brought into operative relation to the sear by the rotary movement of the bolt at the limit of the forward excursion thereof, the sear at this time being entered into the sear-space aforesaid.

2. A bolt gun having a longitudinally movable and rotary bolt provided with a fixed handle comprising an offset from the bolt and a grip offsetting from the rear lower corner of the said offset for the production of a sear-space, a trigger installed in the said handle, a secondary trigger also installed in the said handle to the rear of the trigger proper, and a sear mounted in the receiver of the gun in position to be operated upon by the secondary trigger when the sear has been entered into the said sear-space by the rotation of the bolt at the limit of the forward excursion thereof.

In testimony whereof, I have signed this specification in the presence of two subscribing witnesses.

EDWIN PUGSLEY.

Witnesses:
ERIK S. PALMER,
ARTHUR W. EARLE.

Copies of this patent may be obtained for five cents each, by addressing the "Commissioner of Patents, Washington, D. C."